United States Patent
Lee et al.

(10) Patent No.: US 7,915,770 B2
(45) Date of Patent: Mar. 29, 2011

(54) DEVICE FOR COOLING CURRENT LINES OF SUPERCONDUCTING ROTATING MACHINE

(75) Inventors: Jung hyun Lee, Changwon-si (KR); Je heon Jung, Changwon-si (KR); Woon sik Kwon, Changwon-si (KR); Heui joo Park, Gimhae-si (KR); Chi whan Lee, Dongnae-gu (KR); Yeong chun Kim, Changwon-si (KR)

(73) Assignee: Doosan Heavy Industries & Construction Co., Ltd., Changwon-si (KR)

( * ) Notice: Subject to any disclaimer, the term of this patent is extended or adjusted under 35 U.S.C. 154(b) by 233 days.

(21) Appl. No.: 12/402,045

(22) Filed: Mar. 11, 2009

(65) Prior Publication Data

US 2010/0060089 A1    Mar. 11, 2010

(30) Foreign Application Priority Data

Sep. 11, 2008   (KR) .................. 10-2008-0089754

(51) Int. Cl.
*H02K 9/00* (2006.01)
*H02K 9/20* (2006.01)
*H02K 9/22* (2006.01)
*H02K 9/26* (2006.01)

(52) U.S. Cl. ............. 310/52; 310/53; 310/54; 310/55; 310/56; 310/57; 310/58; 310/60 A; 310/61

(58) Field of Classification Search .......... 310/52, 310/53, 54, 55, 56, 57, 58, 60 A, 61; H02K 9/00, H02K 9/20, 9/22, 9/26

See application file for complete search history.

(56) References Cited

U.S. PATENT DOCUMENTS

| 3,648,088 | A | * | 3/1972 | Wilkin et al. | 310/178 |
|---|---|---|---|---|---|
| 3,742,265 | A | * | 6/1973 | Smith, Jr. | 310/52 |
| 3,944,865 | A | * | 3/1976 | Jewitt | 310/178 |
| 4,110,648 | A | * | 8/1978 | Stillwagon | 310/178 |
| 4,164,671 | A | * | 8/1979 | Gamble | 310/52 |
| 5,942,862 | A | * | 8/1999 | Yamada et al. | 318/9 |
| 6,326,713 | B1 | * | 12/2001 | Judson | 310/112 |
| 2004/0021387 | A1 | * | 2/2004 | Whitesell | 310/168 |
| 2010/0060089 | A1 | * | 3/2010 | Lee et al. | 310/52 |

* cited by examiner

*Primary Examiner* — Quyen Leung
*Assistant Examiner* — John K Kim
(74) *Attorney, Agent, or Firm* — Oblon, Spivak, McClelland, Maier & Neustadt, L.L.P.

(57) ABSTRACT

A cooling device for current lines of a superconducting rotating machine, which is capable of removing heat generated from the current lines of the superconducting rotating machine, thereby effectively preventing a superconducting coil from being deformed due to the heat generated from the current lines, is disclosed. The cooling device includes heat conduction members respectively mounted to outer surfaces of the current lines. Each heat conduction member is in contact with an inner peripheral surface of the stator such that the heat conduction member transfers, to the stator, heat generated from a corresponding one of the current lines. The heat conduction member further includes insulators each surrounding a corresponding one of the current lines between a corresponding one of the heat conduction members and a power slip ring arranged in the stator, to thermally insulate the heat generated from the corresponding current line.

4 Claims, 3 Drawing Sheets

DEVICE FOR COOLING CURRENT LINES OF SUPERCONDUCTING ROTATING MACHINE

BACKGROUND OF THE INVENTION

1. Field of the Invention

The present invention relates to a device for cooling current lines of a superconducting rotating machine, and more particularly to a cooling device for current lines of a superconducting rotating machine, which is capable of removing heat generated from the current lines of the superconducting rotating machine, thereby effectively preventing a superconducting coil from being deformed due to the heat generated from the current lines.

2. Description of the Related Art

Generally, a superconducting rotating machine means a rotary driving device in which a superconducting coil is used as a field coil of a rotor, in place of a copper wire.

Referring to FIG. 3, a conventional superconducting rotating machine is illustrated. The conventional superconducting rotating machine includes a stator 100 having a sealed structure while including a stator coil 101 arranged in the stator 100, and a rotor 200 arranged in the stator 100 while including a superconducting coil 201 arranged around an outer peripheral surface of the rotor 200. The superconducting rotating machine also includes a support 300 mounted to an inner peripheral surface of the rotor 200 while extending through the stator 100, a pair of current lines 400 each connected, at one end thereof, to the superconducting coil 201 while extending horizontally, a power slip ring 500 connected to the other end of each current line 400, and mounted to an outer surface of the support 300 within the stator 100, and a brush 600 extending through the stator 100 while being in contact with the power slip ring 500.

An external electric power is supplied to the power slip ring 500 via the brush 600. The electric power supplied to the power slip ring 500 is applied to the current lines 400 which will rotate together with the rotor 200 while being in contact with the power slip ring 500. The electric power supplied to the current lines 400 is supplied to the superconducting coil 201 of the rotor 200, thereby causing the rotor 200 to rotate within the stator 100.

However, the above-mentioned conventional superconducting rotating machine has various problems.

For example, external heat may be transferred to the current lines via the brush and power slip ring. Furthermore, heat is generated at the current lines due to the resistance of the current lines. Such heat is transferred to the superconducting coil via the current lines, thereby causing the superconducting coil to be deformed.

SUMMARY OF THE INVENTION

The present invention has been made in view of the above mentioned problems, and an object of the invention is to provide a cooling device for current lines of a superconducting rotating machine, which is capable of removing heat generated from the current lines of the superconducting rotating machine, thereby effectively preventing a superconducting coil from being deformed due to the heat generated from the current lines.

Another object of the invention is to provide a cooling device for current lines of a superconducting rotating machine, in which a thermoelectric element is used as a heat conduction member, not only to stably and effectively cool the current lines during supply of electric power through the current lines, but also to remove heat transferred from the current lines as the thermoelectric element comes into contact with air during rotation of a rotor.

In accordance with one aspect, the present invention provides, in a superconducting rotating machine including a stator having a sealed structure while including a stator coil arranged in the stator, a rotor arranged in the stator while including a superconducting coil arranged around an outer peripheral surface of the rotor, a support mounted to an inner peripheral surface of the rotor while extending through the stator, a pair of current lines each connected, at one end thereof, to the superconducting coil while extending horizontally, a power slip ring connected to the other end of each current line, and mounted to an outer surface of the support within the stator, and a brush extending through the stator while being in contact with the power slip ring, a cooling device for the current lines of the superconducting rotating machine, the cooling device comprising: heat conduction members respectively mounted to outer surfaces of the current lines, each heat conduction member being in contact with an inner peripheral surface of the stator such that the heat conduction member transfers, to the stator, heat generated from a corresponding one of the current lines; and insulators each surrounding a corresponding one of the current lines between a corresponding one of the heat conduction members and the power slip ring, to thermally insulate the heat generated from the corresponding current line.

Each heat conduction member may comprise a thermoelectric element including a cooling member mounted to the outer surface of the corresponding current line, and a heat radiating member provided at an upper surface of the cooling member; and a thermal link mounted to an upper surface of the heat radiating member while being in contact with the inner peripheral surface of the stator, to transfer heat from the heat radiating member to the stator, the thermal link being made of a metallic material.

The heat conduction member may further comprise high heat conduction layers respectively coated over upper and lower surfaces of the thermal link, using a material having a high thermal conductivity.

The material of each heat conduction layer may comprise thermal grease or indium.

The cooling device of the present invention can remove heat generated from the current lines of the superconducting rotating machine, thereby effectively preventing a superconducting coil from being deformed due to the heat generated from the current lines.

In the cooling device of the present invention, a thermoelectric element is used as the heat conduction member, so that it is possible not only to stably and effectively cool the current lines during supply of electric power through the current lines, but also to remove heat transferred from the current lines as the thermoelectric element comes into contact with air during rotation of the rotor.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, embodiments of the present invention will be described in detail with reference to the annexed drawings.

Figure 1:
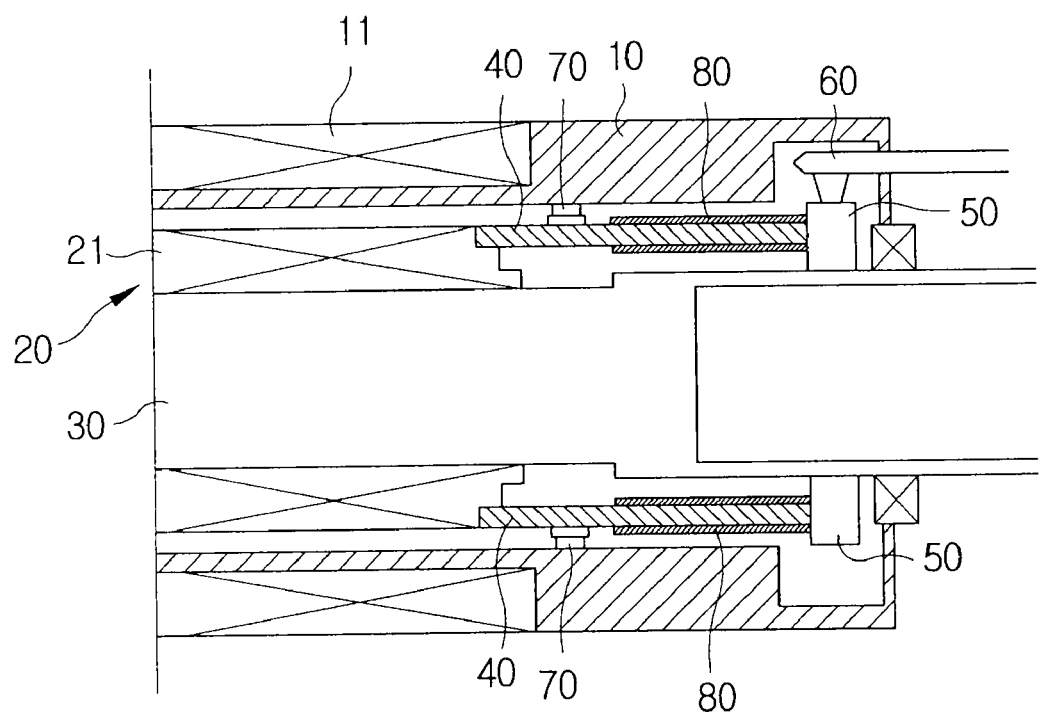
FIG. 1 is a schematic sectional view illustrating a cooling device for a superconducting rotating machine according to the present invention.

FIG. 1 is a schematic sectional view illustrating a cooling device for a superconducting rotating machine according to the present invention.

As shown in FIG. 1, the superconducting rotating machine includes a stator 10 having a sealed structure while including a stator coil 11 arranged in the stator 10, and a rotor 20 arranged in the stator 10 while including a superconducting coil 21 arranged around an outer peripheral surface of the rotor 20. The superconducting rotating machine also includes a support 30 mounted to an inner peripheral surface of the rotor 20 while extending through the stator 10, a pair of current lines 40 each connected, at one end thereof, to the superconducting coil 21 while extending horizontally, a power slip ring 50 connected to the other end of each current line 40, and mounted to an outer surface of the support 30 within the stator 10, and a brush 60 extending through the stator 10 while being in contact with the power slip ring 50.

An external electric power is supplied to the power slip ring 50 via the brush 60. The electric power supplied to the power slip ring 50 is applied to the current lines 40 which will rotate together with the rotor 20 while being in contact with the power slip ring 50. The electric power supplied to the current lines 40 is supplied to the superconducting coil 21 of the rotor 20, thereby causing the rotor 20 to rotate within the stator 10.

The cooling device for the superconducting rotating machine includes heat conduction members 70 respectively mounted to the outer surfaces of the current lines 40, and insulators 80 each surrounding a corresponding one of the current lines 40 between a corresponding one of the heat conduction members 70 and the power slip ring 50.

Each heat conduction member 70 is in contact with the inner peripheral surface of the stator 10, to transfer, to the stator 10, heat generated from the corresponding current line 40, and thus to cool the current line 40.

Each insulator 80, which surrounds the corresponding line 40, thermally insulates the heat generated from the current line 40. By virtue of such thermal insulation, it is also possible to prevent heat transferred from the power slip ring 50 to the current line 40 from being transferred to air present within the stator 10 at the outer surface of the current line 40.

Thus, the heat of each current line 40 is mainly transferred to the corresponding heat conduction member 70, so that the current line 40 may be stably cooled.

Figure 2:
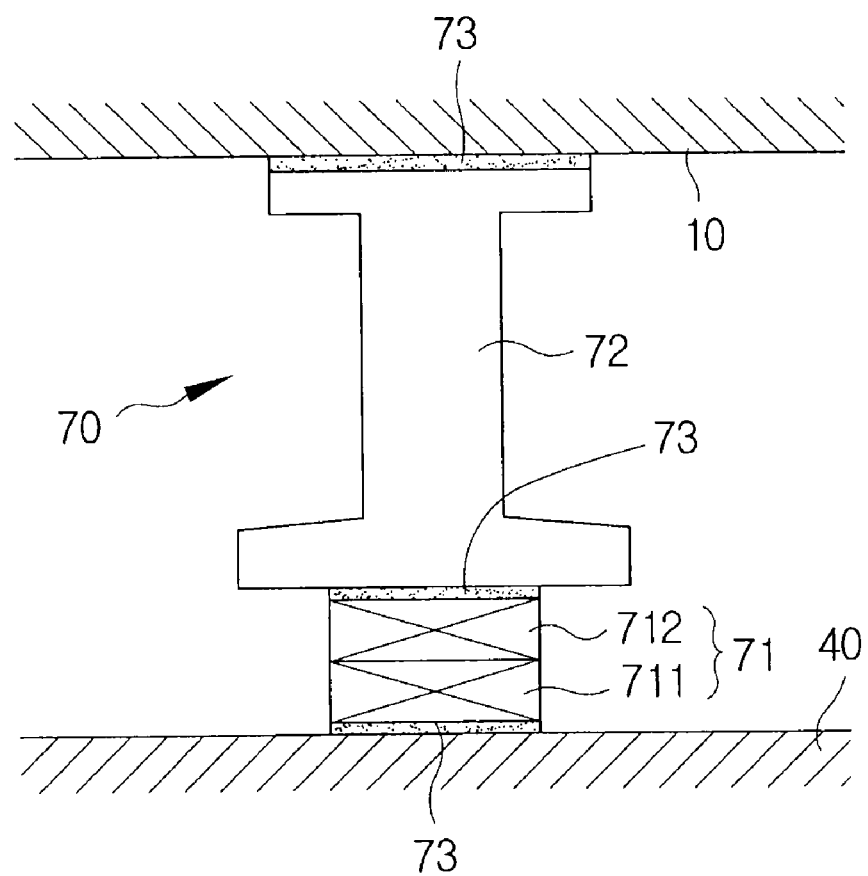
FIG. 2 is an enlarged sectional view illustrating an essential part of the cooling device according to the present invention.
Figure 3:
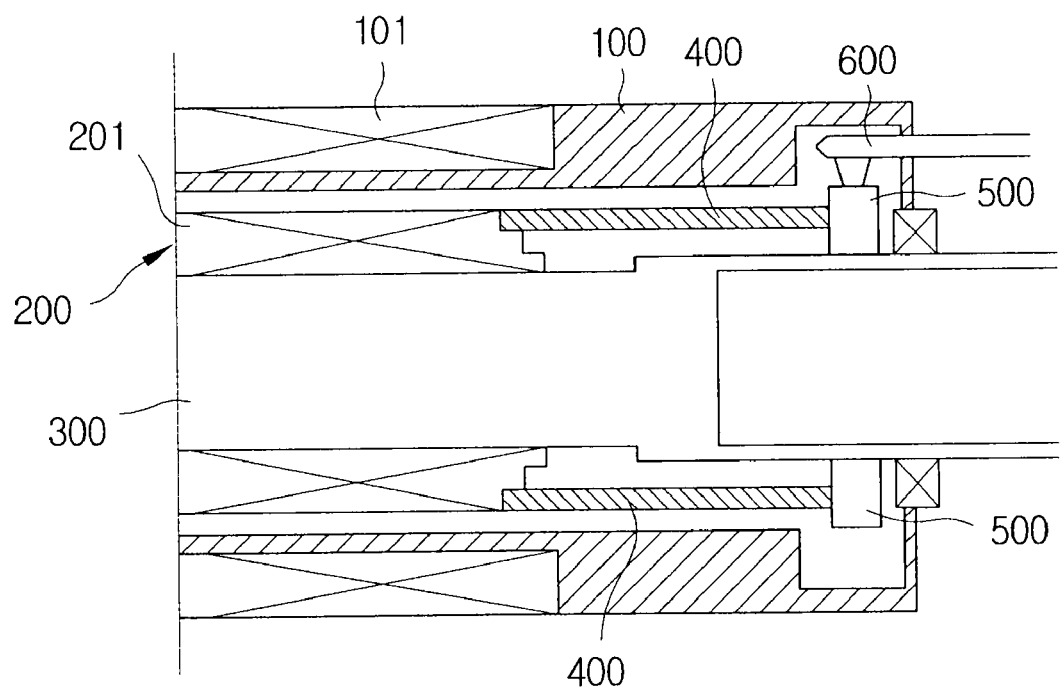
FIG. 3 is a sectional view illustrating a conventional superconducting rotating machine.

FIG. 2 is an enlarged sectional view illustrating an essential part of the cooling device according to the present invention.

As shown in FIG. 2, each heat conduction member 70 includes a thermoelectric element 71. The thermoelectric element 71 includes a cooling member 711 mounted to the outer surface of the corresponding current line 40, and a heat radiating member 712 provided at an upper surface of the cooling member 711. The heat conduction member 70 also includes a thermal link 72 mounted to an upper surface of the heat radiating member 712 while being in contact with the inner peripheral surface of the stator 10. The thermal link 72 is made of a metallic material.

The thermoelectric element 71 exhibits a Peltier effect when it receives electric power. In accordance with the Peltier effect, the thermoelectric element 72 cools the corresponding current line 40 through the cooling member 711, while externally radiating heat from the current line 40 through the heat radiating member 712. The supply of electric power to the thermoelectric element 71 may be achieved by directly connecting electric wires to the power slip ring 50. Of course, other connection methods may be used.

The thermal link 72 may be made of a metallic material such as copper or silver, not only to perform a function to transfer heat radiated from the heat radiating member 712 to the stator 10, but also to radiate heat as it is cooled by air present within the stator 10 while rotating together with the corresponding current line 40.

The heat conduction member 70 further includes high heat conduction layers 73 respectively coated over upper and lower surfaces of the thermal link 72, using a material having a high thermal conductivity. The high heat conduction layers 73 function to achieve effective heat conduction between the current line 40 and the thermoelectric element 71, between the thermoelectric element 71 and the thermal link 72, and between the thermal link 72 and the stator 10.

The high heat conduction layers 73, which have the above-described function, may be made of thermal grease or indium exhibiting excellent heat conductivity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a superconducting rotating machine including a stator having a sealed structure while including a stator coil arranged in the stator, a rotor arranged in the stator while including a superconducting coil arranged around an outer peripheral surface of the rotor, a support mounted to an inner peripheral surface of the rotor while extending through the stator, a pair of current lines each connected, at one end thereof, to the superconducting coil while extending horizontally, a power slip ring connected to the other end of each current line, and mounted to an outer surface of the support within the stator, and a brush extending through the stator while being in contact with the power slip ring, a cooling device for the current lines of the superconducting rotating machine, the cooling device comprising:

heat conduction members respectively mounted to outer surfaces of the current lines, each heat conduction member being in contact with an inner peripheral surface of the stator such that the heat conduction member transfers, to the stator, heat generated from a corresponding one of the current lines; and insulators each surrounding a corresponding one of the current lines between a corresponding one of the heat conduction members and the power slip ring, to thermally insulate the heat generated from the corresponding current line.

2. The cooling device according to claim 1, wherein each heat conduction member comprises a thermoelectric element including a cooling member mounted to the outer surface of the corresponding current line, and a heat radiating member provided at an upper surface of the cooling member; and a thermal link mounted to an upper surface of the heat radiating member while being in contact with the inner peripheral surface of the stator, to transfer heat from the heat radiating member to the stator, the thermal link being made of a metallic material.

3. The cooling device according to claim 2, wherein the heat conduction member further comprises:

high heat conduction layers respectively coated over upper and lower surfaces of the thermal link, using a material having a high thermal conductivity.

4. The cooling device according to claim 3, wherein the material of each heat conduction layer comprises thermal grease or indium.

\* \* \* \* \*